(12) United States Patent
Kang et al.

(10) Patent No.: US 7,305,840 B2
(45) Date of Patent: Dec. 11, 2007

(54) ELECTRICITY GENERATING AND AIR CONDITIONING SYSTEM WITH DEHUMIDIFIER

(75) Inventors: Seung Tak Kang, Seoul (KR); Chang Min Choi, Seoul-si (KR); Won Jae Choi, Seoul (KR); Hyung Soo Lim, Seoul (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 334 days.

(21) Appl. No.: 11/039,852

(22) Filed: Jan. 24, 2005

(65) Prior Publication Data

US 2006/0037350 A1 Feb. 23, 2006

(30) Foreign Application Priority Data

Aug. 17, 2004 (KR) .................. 10-2004-0064817

(51) Int. Cl.
*F25B 27/02* (2006.01)
(52) U.S. Cl. ........................ 62/238.7; 62/271
(58) Field of Classification Search ............ 62/94, 62/271, 238.6, 238.7, 238.3, 324.1
See application file for complete search history.

(56) References Cited

U.S. PATENT DOCUMENTS

| | | | | |
|---|---|---|---|---|
| 2,122,013 A | * | 6/1938 | Smith | ............... 62/94 |
| 3,559,724 A | | 2/1971 | Wilkinson | |
| 4,380,909 A | | 4/1983 | Sung | |
| 4,614,090 A | | 9/1986 | Kaneko et al. | |
| 4,635,446 A | | 1/1987 | Meckler | |
| 4,700,550 A | * | 10/1987 | Rhodes | ............ 62/271 |
| 4,735,061 A | | 4/1988 | Hsieh et al. | |
| 4,819,444 A | | 4/1989 | Meckler | |
| 4,987,750 A | * | 1/1991 | Meckler | ............ 62/238.6 |
| 5,003,788 A | | 4/1991 | Fischer | |
| 5,181,387 A | | 1/1993 | Meckler | |
| 6,196,469 B1 | | 3/2001 | Pearson | |

FOREIGN PATENT DOCUMENTS

| | | |
|---|---|---|
| DE | 197 40 398 A1 | 3/1999 |
| DE | 20 2004 003 532 U1 | 6/2004 |
| EP | 1 202 005 A2 | 5/2002 |
| EP | 1 288 591 A2 | 3/2003 |
| JP | 11-132593 A | 5/1999 |
| JP | 2000-274734 A | 10/2000 |
| JP | 2001-280745 A | 10/2001 |
| JP | 2002-168539 A | 6/2002 |
| WO | WO-87/05683 A1 | 9/1987 |

OTHER PUBLICATIONS

Meckler et al., "Packaging Cogeneration Enhances Desiccant Cooling" Heating, Piping and Air Conditioning, vol. 63, No. 7, pp. 32-36.41 (Jul. 1, 1991).

* cited by examiner

*Primary Examiner*—William E. Tapolcai
(74) *Attorney, Agent, or Firm*—Birch, Stewart, Kolasch & Birch, LLP

(57) ABSTRACT

An electricity generating and air conditioning system with a dehumidifier. The system includes an engine, a generator connected to an output shaft of the engine to generate electricity, a dehumidifying agent body to dehumidify indoor air, a regeneration heater to regenerate the dehumidifying agent body, and a waste heat recovering means to supply waste heat of the engine to the regeneration heater, and thus, to allow the regeneration heater to use the supplied waste heat as a heat source for the regeneration of the dehumidifying agent body, so that the system exhibits a maximal efficiency.

19 Claims, 8 Drawing Sheets

ELECTRICITY GENERATING AND AIR CONDITIONING SYSTEM WITH DEHUMIDIFIER

BACKGROUND OF THE INVENTION

1. Field of the Invention

The present invention relates to an electricity generating and air conditioning system with a dehumidifier, and, more particularly, to an electricity generating and air conditioning system with a dehumidifier in which exhaust gas or cooling water of an engine is used to achieve an improvement in air conditioning efficiency.

2. Description of the Related Art

In general, electricity generating and air conditioning systems generate electricity by use of a rotating force outputted from an engine, and operate an air conditioner by use of the generated electricity. Such electricity generating and air conditioning systems are mainly used for multi-type air conditioners or large-scale air conditioners.

Such electricity generating and air conditioning systems include an engine, a generator connected to an output shaft of the engine to generate electricity, and an air conditioner, which is operated, using the electricity generated from the generator.

However, such a conventional electricity generating and air conditioning system has a problem in that waste heat of exhaust gas discharged from an engine and waste heat of cooling water used to cool the engine are inefficiently re-used, so that the system exhibits a low energy efficiency.

SUMMARY OF THE INVENTION

The present invention has been made in view of the above-mentioned problems, and it is an object of the invention to provide an electricity generating and air conditioning system with a dehumidifier in which waste heat of an engine is recovered to be used as a heat source to regenerate a dehumidifying agent, so that the system exhibits a maximal enhancement in efficiency.

Another object of the invention is to provide an electricity generating and air conditioning system with a dehumidifier in which waste heat of an engine is used as a heat source to regenerate a dehumidifying agent during a cooling operation of a heat pump type air conditioner, and thus, to enhance the pleasantness of a confined space to be air-conditioned, and is used to pre-heat air blown to an outdoor heat exchanger, and thus, to reduce a heating load, so that the system exhibits a maximal enhancement in efficiency.

In accordance with one aspect, the present invention provides an electricity generating and air conditioning system comprising: an engine; a generator connected to an output shaft of the engine to generate electricity; a dehumidifying agent body to dehumidify indoor air; a regeneration heater to regenerate the dehumidifying agent body; and waste heat recovering means to supply waste heat of the engine to the regeneration heater, and thus, to allow the regeneration heater to use the supplied waste heat as a heat source for the regeneration of the dehumidifying agent body.

The waste heat recovering means may comprise a cooling water heat exchanger to absorb heat from cooling water used to cool the engine, an exhaust gas heat exchanger to absorb heat from exhaust gas discharged from the engine, and heat transfer means to transfer heat from at least one of the cooling water heat exchanger and the exhaust gas heat exchanger to the regeneration heater.

In accordance with another aspect, the present invention provides an electricity generating and air conditioning system comprising: an engine; a generator connected to an output shaft of the engine to generate electricity; a heat pump type air conditioner, which comprises a compressor, a directional valve, an outdoor heat exchanger, an expansion device, and an indoor heat exchanger; a dehumidifying agent body to dehumidify indoor air; a regeneration heater to regenerate the dehumidifying agent body; and waste heat recovering means to supply waste heat of the engine to the regeneration heater, and thus, to allow the regeneration heater to use the supplied waste heat as a heat source for the regeneration of the dehumidifying agent body, or to supply the waste heat of the engine to the heat pump type air conditioner.

The waste heat recovering means may comprise a cooling water heat exchanger to absorb heat from cooling water used to cool the engine, an exhaust gas heat exchanger to absorb heat from exhaust gas discharged from the engine, a pre-heater to pre-heat outdoor air blown to the outdoor heat exchanger, and heat transfer means to transfer heat from at least one of the cooling water heat exchanger and the exhaust gas heat exchanger to the regeneration heater during a cooling operation of the heat pump type air conditioner, and to transfer heat from at least one of the cooling water heat exchanger and the exhaust gas heat exchanger to the pre-heater during a heating operation of the heat pump type air conditioner.

In accordance with another aspect, the present invention provides an electricity generating and air conditioning system comprising: an engine; a generator connected to an output shaft of the engine to generate electricity; a cooling water heat exchanger to absorb heat from cooling water used to cool the engine; an exhaust gas heat exchanger to absorb heat from exhaust gas discharged from the engine; a heat pump type air conditioner, which uses the electricity generated from the generator, and comprises an outdoor unit including a compressor, a directional valve, an outdoor heat exchanger, and an expansion device, and an indoor unit including an indoor heat exchanger; a dehumidifying agent body to dehumidify indoor air; a regeneration heater arranged in the indoor unit to regenerate the dehumidifying agent body; a pre-heater to pre-heat outdoor air blown to the outdoor heat exchanger; and heat transfer means to transfer heat from at least one of the cooling water heat exchanger and the exhaust gas heat exchanger to the regeneration heater during a cooling operation of the heat pump type air conditioner, and to transfer heat from at least one of the cooling water heat exchanger and the exhaust gas heat exchanger to the pre-heater during a heating operation of the heat pump type air conditioner.

At least one of the engine, the generator, the indoor heat exchanger, the dehumidifying agent body, the regeneration heater, and the outdoor heat exchanger may comprise a plurality of ones.

The heat transfer means may comprise a pre-heater circulation conduit to guide a heat medium to be circulated through the cooling water heat exchanger, the exhaust gas heat exchanger, and the pre-heater, and a regeneration heater circulation conduit to guide the heat medium to be circulated through the cooling water heat exchanger, the exhaust gas heat exchanger, and the regeneration heater.

The regeneration heater circulation conduit may be branched from the pre-heater circulation conduit.

The heat transfer means may further comprise a heat medium circulation pump to pump the heat medium, and thus, to circulate the heat medium through the pre-heater circulation conduit or through the regeneration heater circulation conduit.

The heat transfer means may further comprise a control valve to alternately open/close the pre-heater circulation conduit and the regeneration heater circulation conduit.

The heat transfer means may further comprise a controller to control the control valve to operate, during a cooling operation of the heat pump type air conditioner, in a cooling mode in which the regeneration heater circulation conduit is opened, and the pre-heater circulation conduit is closed, and to control the control valve to operate, during a heating operation of the heat pump type air conditioner, in a heating mode in which the regeneration heater circulation conduit is closed, and the pre-heater circulation conduit is opened.

The electricity generating and air conditioning system according to the present invention has an advantage in that the waste heat of the engine is used as a heat source to regenerate the dehumidifying agent body, so that the system exhibits a high energy efficiency.

The electricity generating and air conditioning system according to the present invention also has advantages in that the waste heat of the engine is used as a heat source to regenerate the dehumidifying agent body during a cooling operation of the heat pump type air conditioner, and thus, to enhance the pleasantness of a confined space to be air-conditioned, and is used to pre-heat air blown to the outdoor heat exchanger, and thus, to reduce a heating load, so that the system exhibits a maximal enhancement in efficiency.

In addition, the electricity generating and air conditioning system according to the present invention has advantages in that the regeneration heater circulation conduit is branched from the pre-heater circulation conduit such that only one heat medium conduit is provided for both the cooling water heat exchanger and the exhaust gas heat exchanger, so that the circulation conduit structure for the cooling water heat exchanger and exhaust gas heat exchanger is simple, and the number of control valves to be used for the circulation of the heat medium is minimized.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of an electricity generating and air conditioning system according to the present invention will be described with reference to the annexed drawings.

Figure 1:
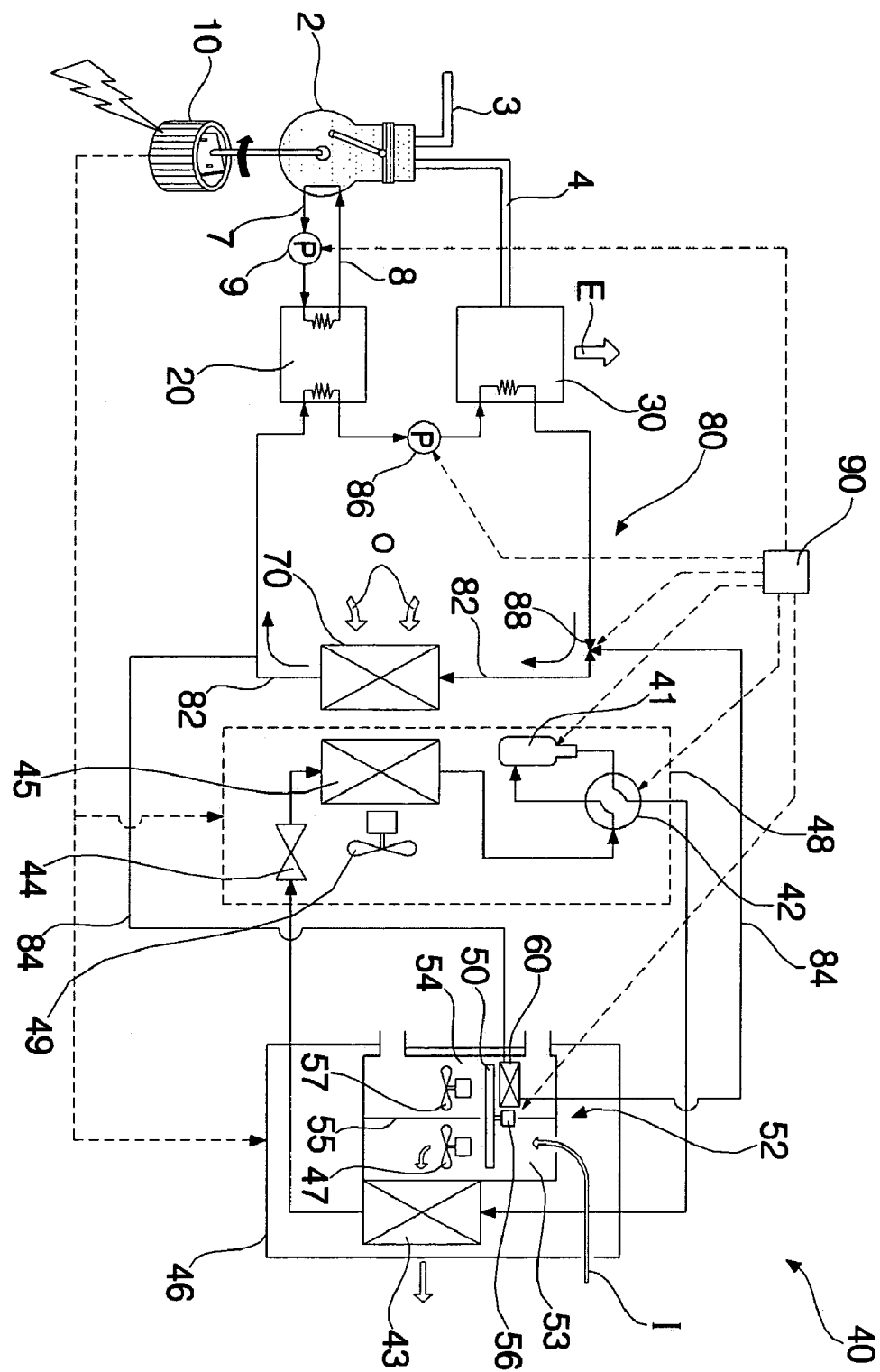
FIG. 1 is a schematic diagram of an electricity generating and air conditioning system with a dehumidifier according to a first embodiment of the present invention, illustrating a state in which the system operates in a heating mode.
Figure 2:
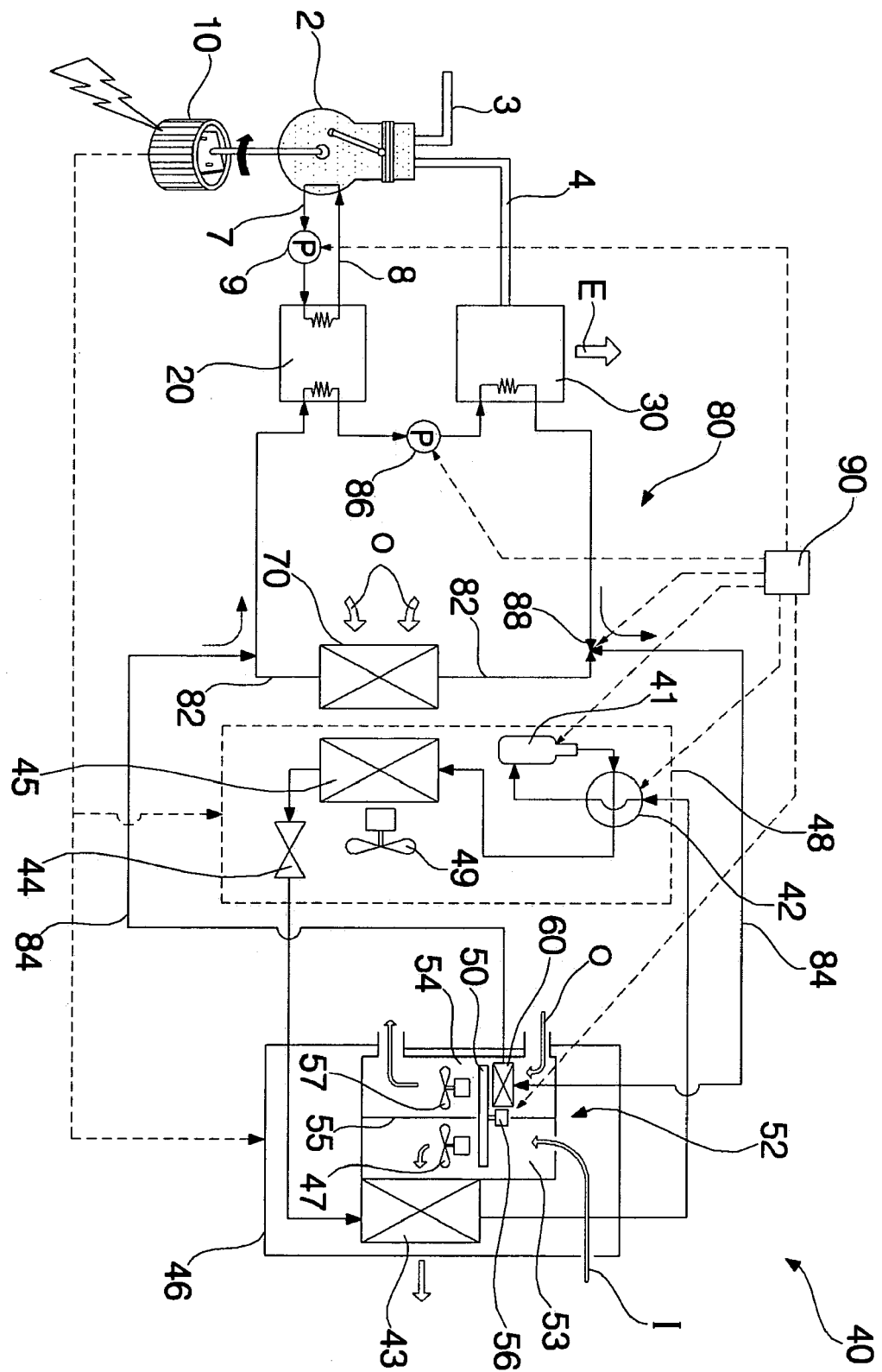
FIG. 2 is a schematic diagram of the electricity generating and air conditioning system with the dehumidifier according to the first embodiment of the present invention, illustrating a state in which the system operates in a cooling mode.

FIG. 1 is a schematic diagram of an electricity generating and air conditioning system with a dehumidifier according to a first embodiment of the present invention, illustrating a state in which the system operates in a heating mode. FIG. 2 is a schematic diagram of the electricity generating and air conditioning system with the dehumidifier according to the first embodiment of the present invention, illustrating a state in which the system operates in a cooling mode.

As shown in FIGS. 1 and 2, the electricity generating and air conditioning system includes an engine 2, a generator 10 connected to an output shaft of the engine 2 to generate electricity, a cooling water heat exchanger 20 to absorb heat from cooling water used to cool the engine 2, and an exhaust gas heat exchanger 30 to absorb heat from exhaust gas discharged from the engine 2. The electricity generating and air conditioning system also includes a heat pump type air conditioner 40, which uses the electricity generated from the generator 10, and includes a compressor 41, a directional valve 42, an indoor heat exchanger 43, an expansion device 44, and an outdoor heat exchanger 45. The electricity generating and air conditioning system further includes a dehumidifying agent body 50 to dehumidify indoor air, a regeneration heater 60 to regenerate the dehumidifying agent body 50, a pre-heater 70 to pre-heat air blown toward the outdoor heat exchanger 45, and a heat transfer means 80 to transfer heat from at least one of the cooling water heat exchanger 20 and exhaust gas heat exchanger 30 to the regeneration heater 60 during a cooling operation of the heat pump type air conditioner 40, and to transfer heat from at least one of the cooling water heat exchanger 20 and exhaust gas heat exchanger 30 to the pre-heater 70 during a heating operation of the heat pump type air conditioner 40.

The engine 2 includes a combustion chamber defined in the interior of the engine 2.

A fuel tube 3 and an exhaust tube 4 are connected to the engine 2. The fuel tube 3 is adapted to supply fuel such as liquefied gas or liquefied petroleum gas into the combustion chamber. The exhaust tube 4 is adapted to guide exhaust gas discharged from the combustion chamber.

The exhaust tube 4 is arranged between the engine 2 and the exhaust gas heat exchanger 30 to guide exhaust gas E discharged from the engine 2 to the exhaust gas heat exchanger 30.

The cooling water heat exchanger 20 is connected to the engine 2 via cooling water circulation conduits 7 and 8 so that the cooling water, which is heated while cooling the engine 2, transfers heat to the cooling water heat exchanger 20 while passing through the cooling water heat exchanger 20, and is then again circulated into the engine 2.

A cooling water circulation pump 9 is connected to one of the engine 2, cooling water heat exchanger 20, and cooling water circulation conduits 7 and 8.

The generator 10 may be an AC generator or a DC generator.

In a heating operation of the heat pump type air conditioner 40, refrigerant, which has been compressed in the compressor 41, flows through the directional valve 42, indoor heat exchanger 43, expansion device 44, outdoor heat exchanger 45, and directional valve 42, in this order, and then enters the compressor 41, as shown in FIG. 1. Thus, the refrigerant is circulated. In this operation, the outdoor heat exchanger 45 functions as an evaporator, whereas the indoor heat exchanger 43 functions as a condenser, and thus, discharges heat to indoor air.

On the other hand, in a cooling operation of the air conditioner 40, refrigerant, which has been compressed in the compressor 41, flows through the directional valve 42, outdoor heat exchanger 45, expansion device 44, indoor heat exchanger 43, and directional valve 42, in this order, and then enters the compressor 41, as shown in FIG. 2. Thus, the refrigerant is circulated. In this operation, the outdoor heat exchanger 45 functions as a condenser, whereas the indoor heat exchanger 43 functions as an evaporator, and thus, absorbs heat from indoor air.

The heat pump type air conditioner 40 further includes an indoor fan or blower 47 to blow indoor air I to the indoor heat exchanger 43. The indoor heat exchanger 43, indoor fan 47, dehumidifying agent body 50, and regeneration heater 60 constitute an indoor unit 46 of the heat pump type air conditioner 40.

The heat pump type air conditioner 40 further includes an outdoor fan or blower 49 to blow outdoor air O to the outdoor heat exchanger 45. The compressor 41, directional valve 42, expansion device 44, outdoor heat exchanger 45, and outdoor fan 49 constitute an outdoor unit 48 of the heat pump type air conditioner 40.

The dehumidifying agent body 50 and regeneration heater 60 constitute a dehumidifier 52, which is also included in the heat pump type air conditioner 40.

The interior of the dehumidifier 52 is partitioned by a barrier 55 to define a dehumidifying chamber 53, through which indoor air blown toward the indoor heat exchanger 43 passes, and a regeneration chamber 54, through which outdoor air to regenerate the dehumidifying agent body 50 passes.

The dehumidifying agent body 50 extends through the barrier 55 such that a portion of the dehumidifying agent body 50 is arranged in the dehumidifying chamber 53, and the remaining portion of the dehumidifying agent body 50 is arranged in the regeneration chamber 54.

The regeneration heater 60 is arranged in the regeneration chamber 54.

The dehumidifier 52 further includes a driving means 56 such as a motor to rotate the dehumidifying agent body 50 such that the portion of the dehumidifying agent body 50, which is arranged in the dehumidifying chamber 53, is moved to the regeneration chamber 54 after dehumidifying indoor air in the dehumidifying chamber 53 so that the portion of the dehumidifying agent body 50 is dehumidified in the regeneration chamber 54 by the regeneration heater 60.

The dehumidifier 52 further includes a regeneration fan or blower 57 to blow outdoor air O such that the outdoor air O passes through the dehumidifying agent body 50 in a state of being heated by the regeneration heater 60 while passing through the regeneration heater 60, and is then discharged to the atmosphere.

The pre-heater 70 is arranged upstream from the outdoor heat exchanger 45 with respect to a flowing direction of outdoor air O blown toward the outdoor heat exchanger 45, to pre-heat the outdoor air O.

The heat transfer means 80 may be configured to absorb waste heat from only one of the cooling water heat exchanger 20 and exhaust gas heat exchanger 30. Alternatively, the heat transfer means 80 may be configured to absorb waste heat from both the cooling water heat exchanger 20 and the exhaust gas heat exchanger 30 in an independent manner. The following description will be given only in conjunction with the case in which the heat transfer means 80 absorbs waste heat from both the cooling water heat exchanger 20 and the exhaust gas heat exchanger 30 in an independent manner.

The heat transfer means 80 includes a pre-heater circulation conduit 82 to guide a heat medium to be circulated through the cooling water heat exchanger 20, exhaust gas heat exchanger 30, and pre-heater 70, and a regeneration heater circulation conduit 84 to guide the heat medium to be circulated through the cooling water heat exchanger 20, exhaust gas heat exchanger 30, and regeneration heater 60.

The pre-heater circulation conduit 82 and regeneration heater circulation conduit 84 of the heat transfer means 80 may be independent of each other such that a first heat medium is circulated through the pre-heater circulation conduit 82, and a second heat medium is circulated through the regeneration heater circulation conduit 84. Alternatively, the regeneration heater circulation conduit 84 may be branched from the pre-heater circulation conduit 82 such that a heat medium is selectively circulated through the pre-heater circulation conduit 82 or regeneration heater circulation conduit 84. The following description will be given only in conjunction with the case in which the regeneration heater circulation conduit 84 is branched from the pre-heater circulation conduit 82.

The heat transfer means 80 further includes a heat medium circulation pump 86 to pump the heat medium, and thus, to circulate the heat medium through the pre-heater circulation conduit 82 or regeneration heater circulation conduit 84.

The heat transfer means 80 further includes a control valve 88 to alternately open/close the pre-heater circulation conduit 82 and regeneration heater circulation conduit 84.

Although only one control valve 88 is arranged at a connection region where the regeneration heater circulation conduit 84 is branched from the pre-heater circulation conduit 82, to alternately open/close the pre-heater circulation conduit 82 and regeneration heater circulation conduit 84, in the illustrated case, two control valves 88 may be arranged at both the pre-heater circulation conduit 82 and regeneration heater circulation conduit 84, to open/close the conduits 82 and 84 in an independent manner, respectively. The following description will be given only in conjunction with the case in which only one control valve 88 is arranged to alternately open/close the pre-heater circulation conduit 82 and regeneration heater circulation conduit 84.

The heat transfer means 80 further includes a controller 90 to control the control valve 88 to operate, during a cooling operation of the heat pump type air conditioner 40, in a cooling mode in which the regeneration heater circulation conduit 84 is opened, and the pre-heater circulation conduit 82 is closed, and to control the control valve 88 to operate, during a heating operation of the heat pump type air conditioner 40, in a heating mode in which the regeneration heater circulation conduit 84 is closed, and the pre-heater circulation conduit 82 is opened.

Hereinafter, operation of the system having the above-described arrangement will be described.

When fuel is supplied to the engine 2 via the fuel tube 3, and the engine 2 is subsequently driven, the output shaft of the engine 2 is rotated, thereby causing the generator 10 to generate electricity.

Exhaust gas, which is discharged from the engine 2 during the operation of the engine 2, is fed to the exhaust gas heat exchanger 30, and is then discharged to the atmosphere after releasing its heat into the exhaust gas heat exchanger 30.

During the operation of the engine 2, the cooling water circulation pump 9 operates. In accordance with the operation of the cooling water circulation pump 9, cooling water, which is heated while cooling the engine 2, is fed to the cooling water heat exchanger 20 via the cooling water circulation conduit 7, and is then circulated into the engine 2 via the cooling water circulation conduit 8 after releasing its heat into the cooling water heat exchanger 20.

When the heat pump type air conditioner 40 operates in the heating mode, the compressor 41 is driven by the electricity generated from the generator 10. In this case, the directional valve 42 is switched to a heating mode, and the heat medium circulation pump 86 is driven. Also, the control valve 88 is switched to a heating mode.

When the directional valve 42 is switched to the heating mode, and the compressor 41 operates, as shown in FIG. 1, the compressor 41 compresses low-temperature and low-pressure refrigerant gas, thereby changing the refrigerant gas into a high-temperature and high-pressure state. The high-temperature and high-pressure refrigerant gas is fed into the indoor heat exchanger 43 via the directional valve 42, and discharges its heat to indoor air while passing through the indoor heat exchanger 43, so that the refrigerant gas is condensed.

Subsequently, the condensed refrigerant is expanded while passing through the expansion device 44, and is then fed into the outdoor heat exchanger 45. The expanded refrigerant absorbs heat from outdoor air while passing through the outdoor heat exchanger 45, so that the refrigerant is evaporated.

The evaporated refrigerant is subsequently circulated into the compressor 41 via the directional valve 42. As the circulation of the refrigerant is repeated, a confined space, in which indoor air is circulated, is continuously heated.

When the control valve 88 is switched to the heating mode, and the heat medium circulation pump 86 is driven, the heat medium heated by the cooling water heat exchanger 20 is re-heated by the exhaust gas heat exchanger 30, and is then guided to the pre-heater circulation conduit 82, and thus, the pre-heater 70, by the control valve 88. After releasing heat into the pre-heater 70, that is, heating the pre-heater 70, the heat medium is circulated into the cooling water heat exchanger 20. As the circulation of the heat medium is repeated, the pre-heater 70 is continuously heated.

Meanwhile, the pre-heater 70, which is heated as described above, heats air blown toward the outdoor heat exchanger 45, so that the outdoor heat exchanger 45 is not frosted.

On the other hand, when the heat pump type air conditioner operates in a cooling mode, the compressor 41 is driven by the electricity generated from the generator 10. In this case, the directional valve 42 is switched to the cooling mode, and the heat medium circulation pump 86 is driven. Also, the control valve 88 is switched to the cooling mode, and the dehumidifier 52 is driven.

When the directional valve 42 is switched to the cooling mode, and the compressor 41 operates, as shown in FIG. 2, the compressor 41 compresses low-temperature and low-pressure refrigerant gas, thereby changing the refrigerant gas into a high-temperature and high-pressure state. The high-temperature and high-pressure refrigerant gas is fed into the outdoor heat exchanger 45 via the directional valve 42, and discharges its heat to outdoor air while passing through the outdoor heat exchanger 45, so that the refrigerant gas is condensed.

Subsequently, the condensed refrigerant is expanded while passing through the expansion device 44, and is then fed into the indoor heat exchanger 43. The expanded refrigerant absorbs heat from indoor air while passing through the indoor heat exchanger 43, so that the refrigerant is evaporated.

The evaporated refrigerant is circulated into the compressor 41 via the directional valve 42. As the circulation of the refrigerant is repeated, the confined space is continuously cooled.

Meanwhile, when the control valve 88 is switched to the cooling mode, and the heat medium circulation pump 86 operates, the heat medium heated by the cooling water heat exchanger 20 is re-heated by the exhaust gas heat exchanger 30, and is then guided to the regeneration heater circulation conduit 84, and thus, the regeneration heater 60, by the control valve 88. After releasing heat into the regeneration heater 60, that is, heating the regeneration heater 60, the heat medium is circulated into the cooling water heat exchanger 20. As the circulation of the heat medium is repeated, the regeneration heater 60 is continuously heated.

When the dehumidifier 52 is to be driven, the driving means 56 such as a motor rotates the dehumidifying agent body 50 while driving the regeneration blower 57.

During the operation of the regeneration blower 57, outdoor air is heated by the regeneration heater 60. The heated outdoor air regenerates the dehumidifying agent body 50 while passing through the dehumidifying agent body 50, and is then discharged to the atmosphere.

Figure 3:
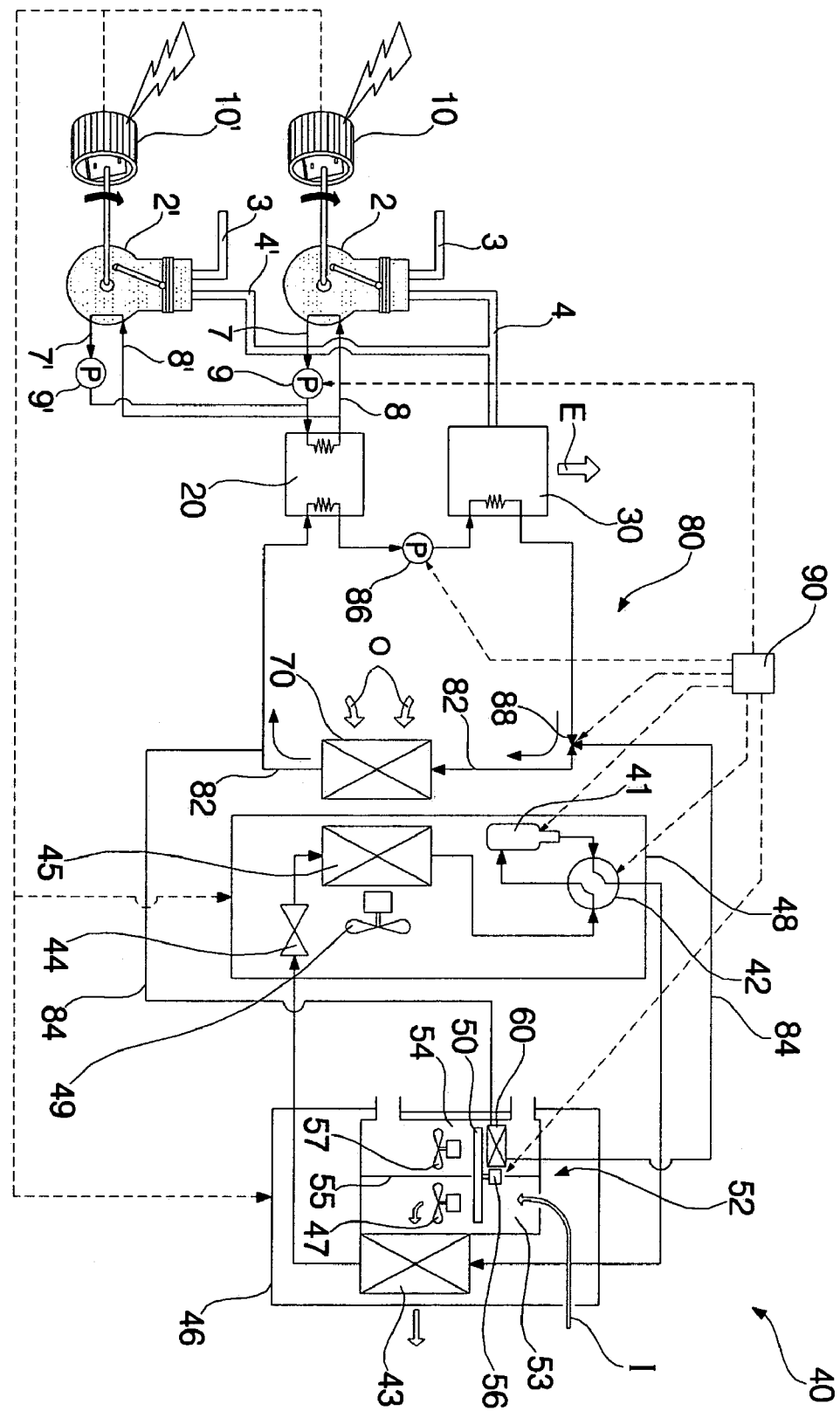
FIG. 3 is a schematic diagram of an electricity generating and air conditioning system with a dehumidifier according to a second embodiment of the present invention, illustrating a state in which the system operates in a heating mode.
Figure 4:
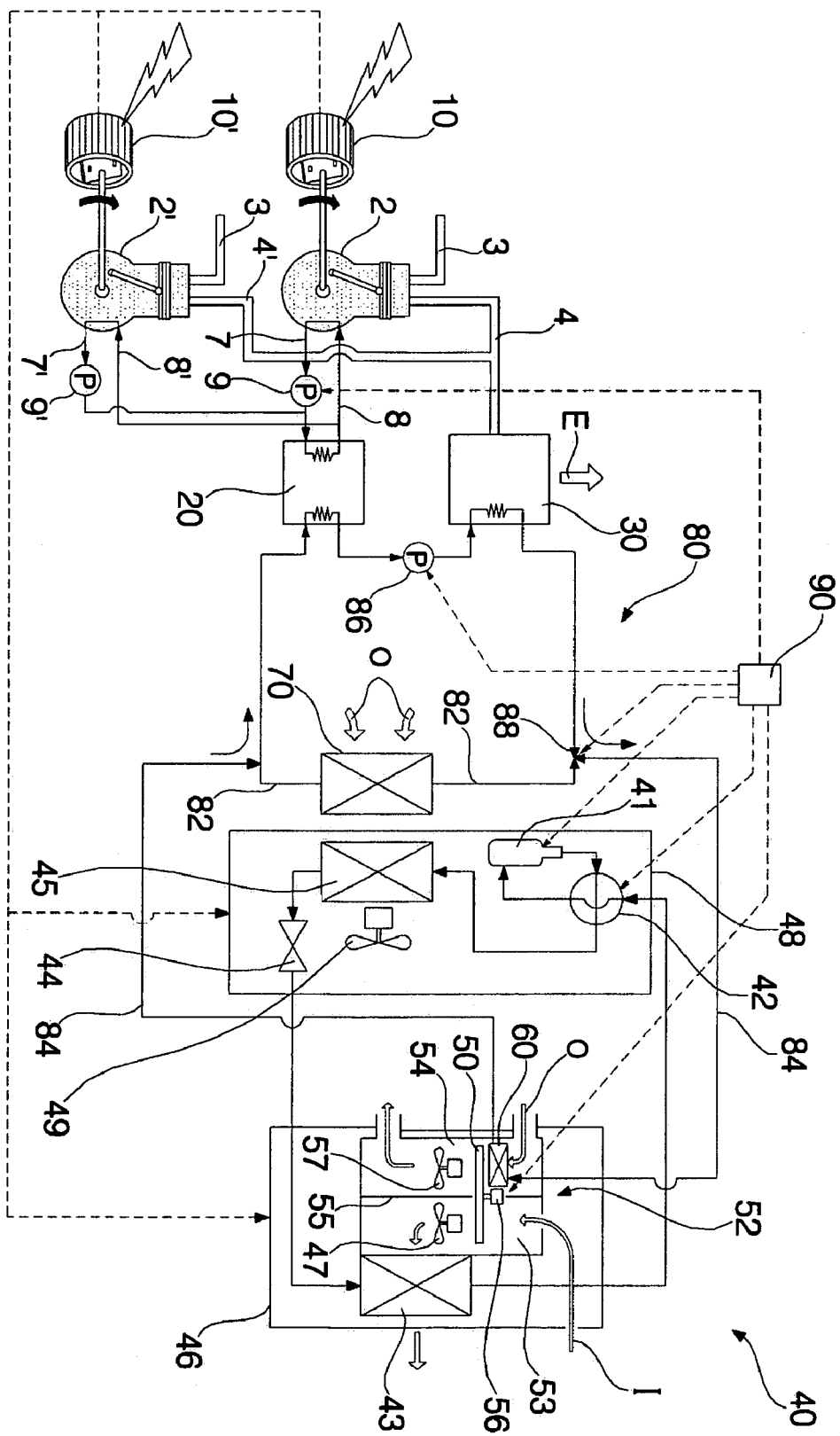
FIG. 4 is a schematic diagram of the electricity generating and air conditioning system with the dehumidifier according to the second embodiment of the present invention, illustrating a state in which the system operates in a cooling mode.

FIG. 3 is a schematic diagram of an electricity generating and air conditioning system with a dehumidifier according to a second embodiment of the present invention, illustrating a state in which the system operates in a heating mode. FIG. 4 is a schematic diagram of the electricity generating and air conditioning system with the dehumidifier according to the second embodiment of the present invention, illustrating a state in which the system operates in a cooling mode.

As shown in FIGS. 3 and 4, the electricity generating and air conditioning system includes a plurality of engines 2, 2' . . . . The electricity generating and air conditioning system also includes a plurality of generators 10, 10' . . . connected to respective shafts of the engines 2, 2' . . . .

One or more of the engines 2, 2' . . . operate in accordance with the load to be cooled or heated.

Fuel tubes 3, 3' . . . and exhaust tubes 4, 4' . . . are connected to respective engines 2, 2' . . . . Also, pairs of cooling water circulation conduits 7 and 8, 7' and 8' . . . are connected to respective engines 2, 2' . . . .

The exhaust gas tubes 4, 4' . . . are connected in parallel.

The cooling water circulation conduits 7 and 8, 7' and 8' . . . are connected in parallel.

Cooling water circulation pumps 9, 9' . . . are directly connected to the cooling water circulation conduit 7 or 8, cooling water circulation conduit 7' or 8' . . . , respectively.

The electricity generating and air conditioning system of the second embodiment has the same configuration and functions as those of the first embodiment, except for the engines 2, 2' . . . and generators 10, 10' . . . . Accordingly, the constituent elements of the second embodiment respectively corresponding to those of the first embodiment are designated by the same reference numerals, and no detailed description thereof will be given.

Figure 5:
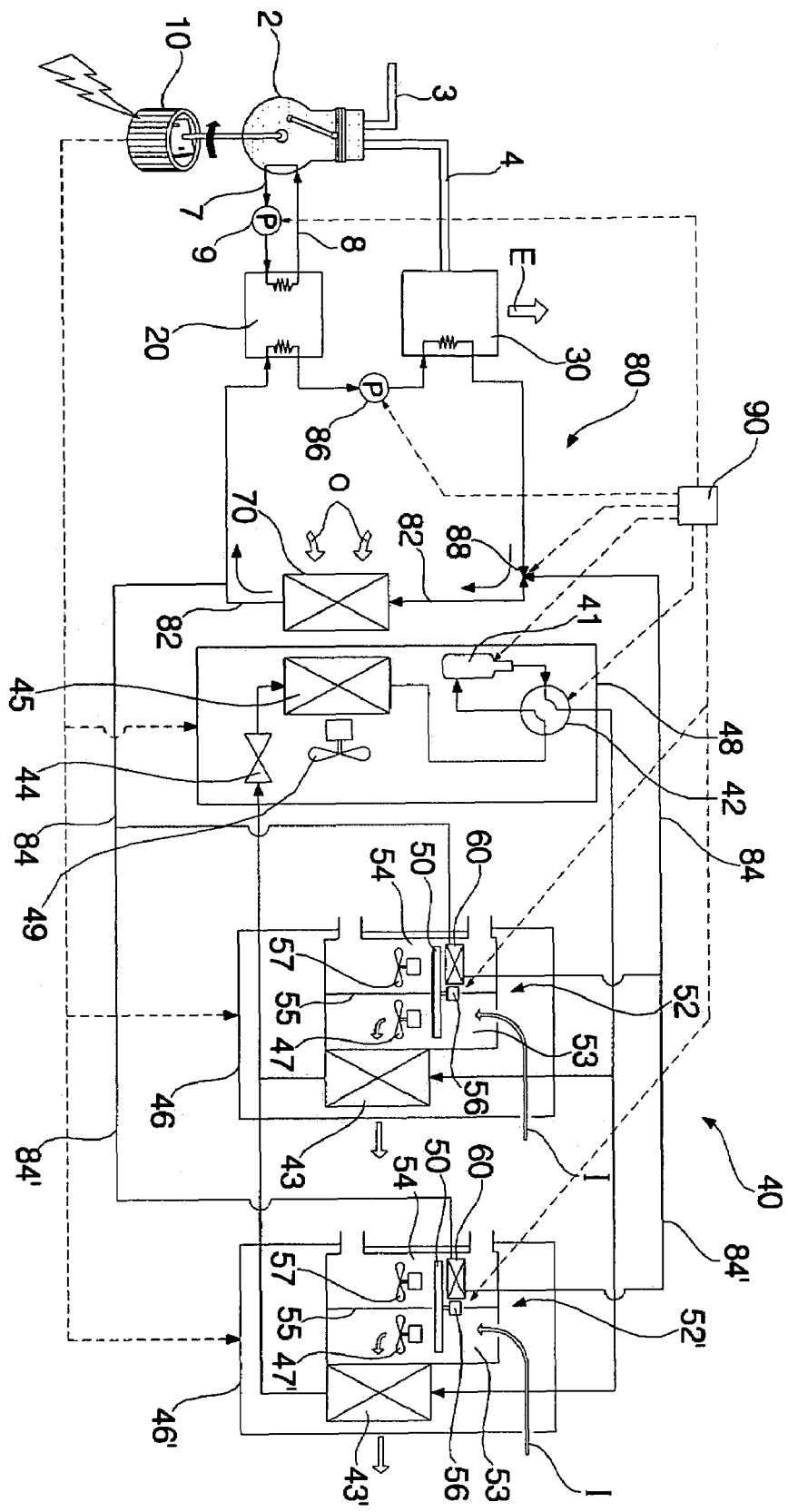
FIG. 5 is a schematic diagram of an electricity generating and air conditioning system with a dehumidifier according to a third embodiment of the present invention, illustrating a state in which the system operates in a heating mode.
Figure 6:
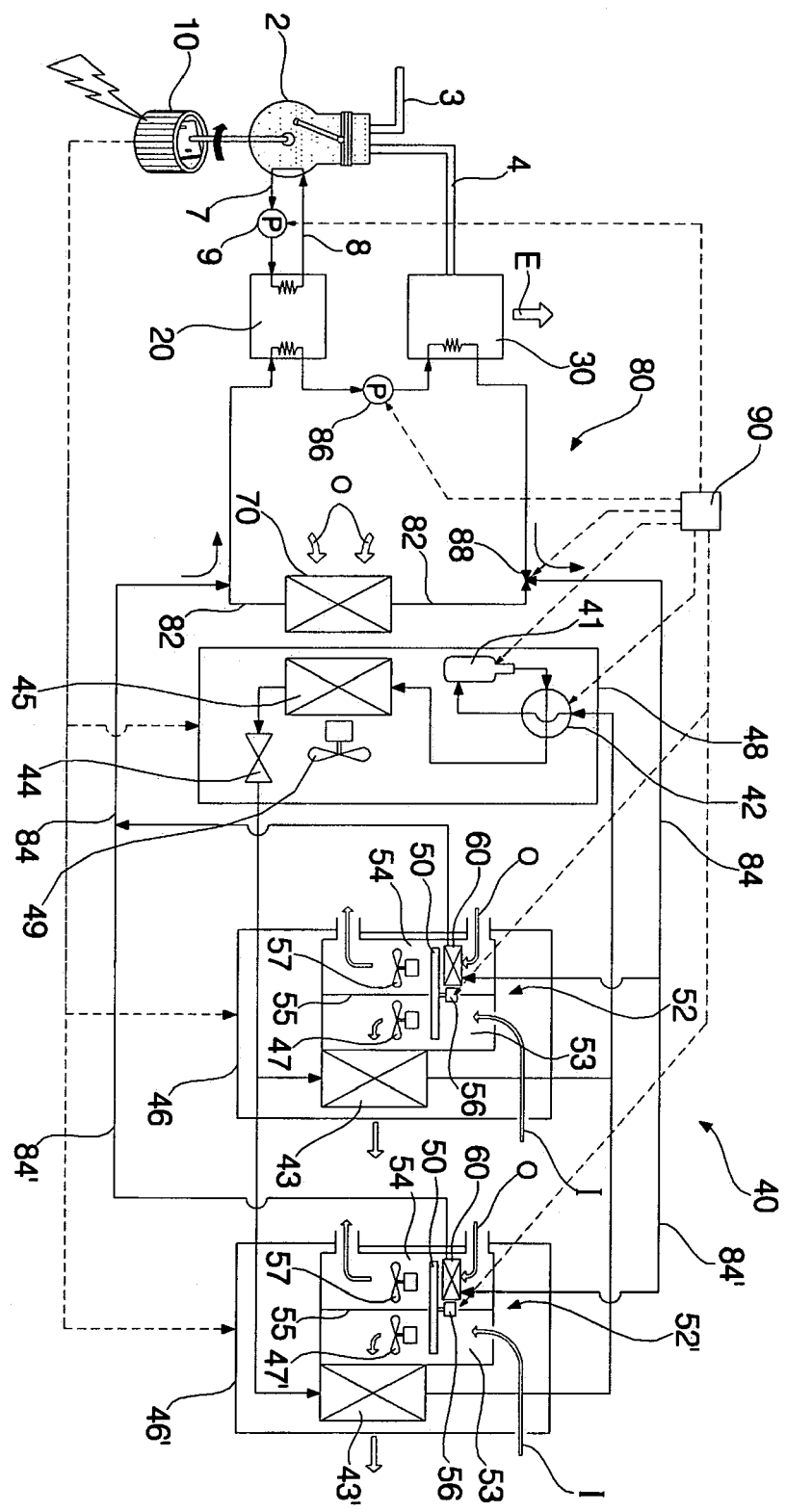
FIG. 6 is a schematic diagram of the electricity generating and air conditioning system with the dehumidifier according to the third embodiment of the present invention, illustrating a state in which the system operates in a cooling mode.

FIG. 5 is a schematic diagram of an electricity generating and air conditioning system with a dehumidifier according to a third embodiment of the present invention, illustrating a state in which the system operates in a heating mode. FIG. 6 is a schematic diagram of the electricity generating and air conditioning system with the dehumidifier according to the third embodiment of the present invention, illustrating a state in which the system operates in a cooling mode.

As shown in FIGS. 5 and 6, the heat pump type air conditioner, that is, the heat pump type air conditioner 40, which is included in the electricity generating and air conditioning system, is of a multi-type. That is, the heat pump type air conditioner 40 includes a plurality of indoor units 46, 46' . . . , and a single outdoor unit 48. The indoor units 46, 46' . . . include indoor heat exchangers 43, 43' . . . , which are connected in parallel, respectively.

The indoor units 46, 46' . . . also include indoor blowers 47, 47' . . . , respectively.

Humidifiers 52, 52' . . . , each of which includes a humidifying agent body 50 and a regeneration heater 60, are also included in respective indoor units 46, 46' . . . .

Each of the dehumidifiers 52, 52' . . . is the same as the dehumidifier included in the electricity generating and air conditioning system according to the first embodiment of the present invention, so that no detailed description thereof will be given.

Regeneration heater circulation conduits 84, 84' . . . , which are connected in parallel, guide a heat medium to respective regeneration heaters 60.

The electricity generating and air conditioning system of this embodiment has the same configuration and functions as those of the first embodiment, except that the heat pump type air conditioner 40 includes a plurality of indoor units 46, 46' . . . , a plurality of dehumidifiers 52, 52' . . . , and a plurality of regeneration heater circulation conduits 84, 84' . . . . Accordingly, the constituent elements of the third embodiment respectively corresponding to those of the first embodiment are designated by the same reference numerals, and no detailed description thereof will be given.

Figure 7:
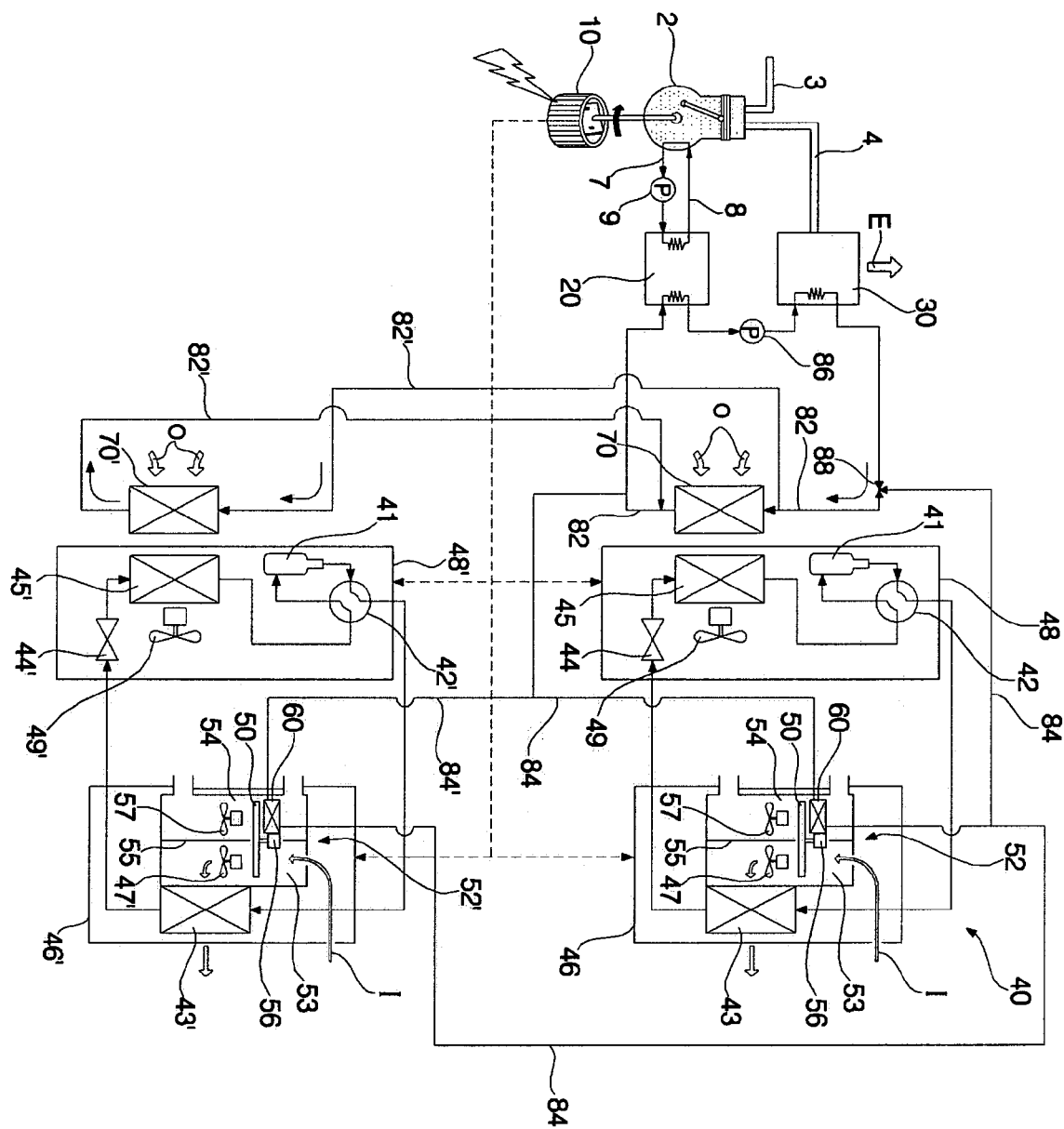
FIG. 7 is a schematic diagram of an electricity generating and air conditioning system with a dehumidifier according to a fourth embodiment of the present invention, illustrating a state in which the system operates in a heating mode.
Figure 8:
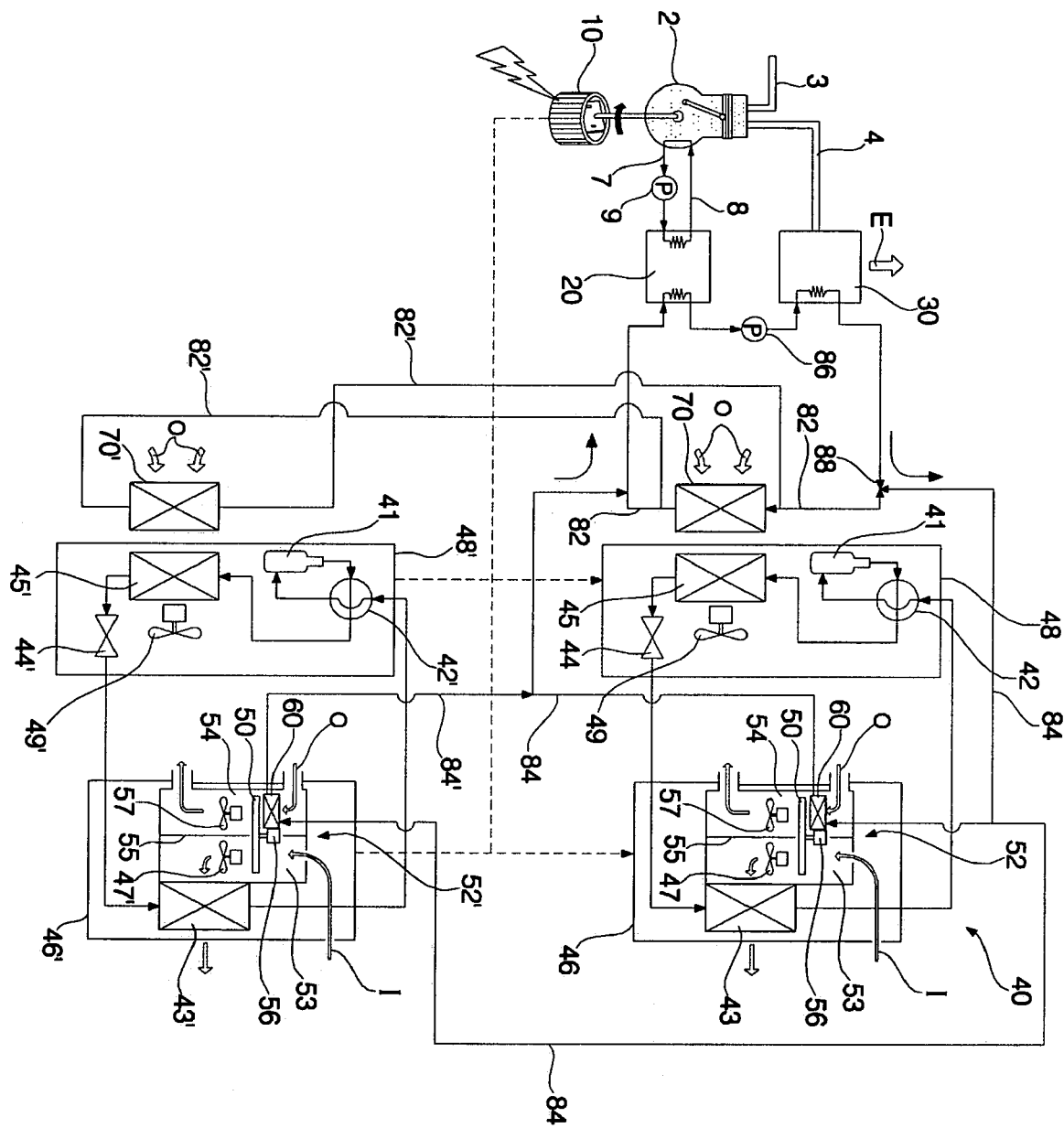
FIG. 8 is a schematic diagram of the electricity generating and air conditioning system with the dehumidifier according to the fourth embodiment of the present invention, illustrating a state in which the system operates in a cooling mode.

FIG. 7 is a schematic diagram of an electricity generating and air conditioning system with a dehumidifier according to a fourth embodiment of the present invention, illustrating a state in which the system operates in a heating mode. FIG. 8 is a schematic diagram of the electricity generating and air conditioning system with the dehumidifier according to the fourth embodiment of the present invention, illustrating a state in which the system operates in a cooling mode.

As shown in FIGS. 7 and 8, the heat pump type air conditioner, that is, the heat pump type air conditioner 40, which is included in the electricity generating and air conditioning system, includes a plurality of indoor units 46, 46' . . . , and a plurality of outdoor units 48, 48' . . . .

In the heat pump type air conditioner 40, refrigerant conduits respectively included in the indoor units 46, 46' . . . may be connected in parallel. Refrigerant conduits respectively included in the outdoor units 48, 48' . . . may also be connected in parallel. The following description will be given in conjunction with the case in which each of the outdoor units 48, 48' . . . are connected to an associated one of the indoor units 46, 46' . . . to constitute one air conditioner set, and each air conditioner set operates independently of other air conditioner sets.

The indoor units 46, 46' . . . include respective indoor heat exchangers 43, 43' . . . , and respective indoor blowers 47, 47' . . . .

Humidifiers 52, 52' . . . , each of which includes a humidifying agent body 50 and a regeneration heater 60, are also included in respective indoor units 46, 46' . . . .

Each of the dehumidifiers 52, 52' . . . is the same as the dehumidifier included in the electricity generating and air conditioning system according to the first embodiment of the present invention, so that no detailed description thereof will be given.

The outdoor units 48, 48' . . . include respective compressors 41, 41' . . . , directional valves 42, 42' . . . , respective expansion devices 44, 44' . . . , respective outdoor heat exchangers 45, 45' . . . , and respective outdoor blowers 49, 49' . . . .

Pre-heaters 70, 70' . . . are arranged upstream from respective outdoor heat exchangers 45, 45' . . . to pre-heat outdoor air blown to the outdoor heat exchangers 45, 45' . . . , respectively.

First pre-heater circulation conduits 82, 82' . . . , which are connected in parallel, are connected to respective pre-heaters 70, 70' . . . . to guide a heat medium to be circulated through the pre-heaters 70, 70' . . . .

Regeneration heater circulation conduits 84, 84' . . . , which are connected in parallel, are connected to respective regeneration heaters 60 . . . to guide a heat medium to be circulated through the regeneration heaters 60 . . . .

The electricity generating and air conditioning system of this embodiment has the same configuration and functions as those of the first embodiment, except that the heat pump type air conditioner 40 includes a plurality of indoor units 46, 46' . . . , a plurality of dehumidifiers 52, 52' . . . , a plurality of outdoor units 48, 48' . . . , a plurality of pre-heaters 70, 70' . . . , a plurality of pre-heater circulation conduits 82, 82' . . . , and a plurality of regeneration heater circulation conduits 84, 84' . . . . Accordingly, the constituent elements of the fourth embodiment respectively corresponding to those of the first embodiment are designated by the same reference numerals, and no detailed description thereof will be given.

The electricity generating and air conditioning system with the dehumidifier according to any one of the above-described embodiments of the present invention has various effects.

That is, the electricity generating and air conditioning system according to the present invention has an advantage in that the waste heat of the engine is used as a heat source to regenerate the dehumidifying agent body included in the dehumidifier, so that the system exhibits a high energy efficiency.

The electricity generating and air conditioning system according to the present invention also has advantages in that the waste heat of the engine is used as a heat source to regenerate the dehumidifying agent body during a cooling operation of the heat pump type air conditioner, and thus, to enhance the pleasantness of a confined space to be air-conditioned, and is used to pre-heat air blown to the outdoor heat exchanger, and thus, to reduce a heating load, so that the system exhibits a maximal enhancement in efficiency.

In addition, the electricity generating and air conditioning system according to the present invention has advantages in that the regeneration heater circulation conduit is branched from the pre-heater circulation conduit such that only one heat medium conduit is provided for both the cooling water heat exchanger and the exhaust gas heat exchanger, so that the circulation conduit structure for the cooling water heat exchanger and exhaust gas heat exchanger is simple, and the number of control valves to be used for the circulation of the heat medium is minimized.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An electricity generating and air conditioning system comprising:
   an engine;
   a generator connected to an output shaft of the engine to generate electricity;
   a heat pump type air conditioner, which comprises a compressor, a directional valve, an outdoor heat exchanger, an expansion valve, and an indoor heat exchanger;
   a dehumidifying agent body to dehumidify indoor air;
   a regeneration heater to regenerate the dehumidifying agent body;
   a pre-heater to pre-heat outdoor air blown to the outdoor heat exchanger; and
   waste heat recovering means to supply waste heat of the engine to the regeneration heater, during a cooling operation of the heat pump type air conditioner to regenerate the dehumidifying agent body, and to supply waste heat of the engine to the pre-heater during a heating operation of the heat pump type air conditioner to pre-heat outdoor air blown to the outdoor heat exchanger.

2. The electricity generating and air conditioning system according to claim 1, wherein the waste heat recovering means comprises:
   a cooling water heat exchanger to absorb heat from cooling water used to cool the engine;
   an exhaust gas heat exchanger to absorb heat from exhaust gas discharged from the engine; and
   heat transfer means to transfer heat from at least one of the cooling water heat exchanger and the exhaust gas heal exchanger to the regeneration heater.

3. The electricity generating and air conditioning system according to claim 2, wherein the heat transfer means comprises a regeneration heater circulation conduit to guide a heat medium to be circulated through the cooling water heat exchanger, the exhaust gas heat exchanger, and the regeneration heater.

4. The electricity generating and air conditioning system according to claim 3, wherein the heat transfer means farther comprises a heat medium circulation pump to pump the heat medium.

5. The electricity generating and air conditioning system according to claim 1, wherein at least one of the engine, the generator, and the dehumidifying agent body comprises a plurality of ones.

6. An electricity generating and air conditioning system comprising:
   an engine;
   a generator connected to an output shaft of the engine to generate electricity;
   a heat pump type air conditioner, which comprises a compressor, a directional valve, an outdoor heat exchanger, an expansion device, and an indoor heat exchanger;
   a dehumidifying agent body to dehumidify indoor air;
   a regeneration heater to regenerate the dehumidifying agent body; and
   waste heat recovering means to supply waste heat of the engine to the regeneration heater, and thus, to allow the regeneration heater to use the supplied waste heat as a heat source for the regeneration of the dehumidifying agent body, or to supply the waste heat of the engine to the heat pump type air conditioner,
   wherein the waste heat recovering means comprises:
   a cooling water heat exchanger to absorb heat from cooling water used to cool the engine;
   an exhaust gas heat exchanger to absorb heat from exhaust gas discharged from the engine;
   a pre-heater to pre-heat outdoor air blown to the outdoor heat exchanger; and
   heat transfer means to transfer heat from at least one of the cooling water heat exchanger and the exhaust gas heat exchanger to the regeneration heater during a cooling operation of the heat pump type air conditioner, and to transfer heat from at least one of the cooling water heat exchanger and the exhaust as heat exchanger to the pre-heater during a heating operation of the heat pump type air conditioner.

7. The electricity generating and air conditioning system according to claim 6, wherein the heat pump type air conditioner uses the electricity generated from the generator.

8. The electricity generating and air conditioning system according to claim 6, wherein the heat pump type air conditioner comprises:
   an outdoor unit including a compressor, a directional valve, an outdoor heat exchanger, and an expansion device; and
   an indoor unit including an indoor heat exchanger.

9. The electricity generating and air conditioning system according to claim 8, wherein the dehumidifying agent body and the regeneration heater are arranged in the indoor unit.

10. The electricity generating and air conditioning system according to claim 6, wherein the heat transfer means comprises:
    a pre-heater circulation conduit to guide a heat medium to be circulated through the cooling water heat exchanger, the exhaust gas heat exchanger, and the pre-heater; and
    a regeneration heater circulation conduit to guide the heat medium to be circulated through the cooling water heat exchanger, the exhaust gas heat exchanger, and the regeneration heater.

11. The electricity generating and air conditioning system according to claim 10, wherein the regeneration heater circulation conduit is bypassed from the pre-heater circulation conduit.

12. The electricity generating and air conditioning system according to claim 10, wherein the heat transfer means further comprises:
    a heat medium circulation pump to pump the heat medium, and thus, to circulate the heat medium through the pre-heater circulation conduit or through the regeneration heater circulation conduit.

13. The electricity generating and air conditioning system according to claim 10, wherein the heat transfer means further comprises:

a control valve to alternately open/close the pre-heater circulation conduit and the regeneration heater circulation conduit.

14. The electricity generating and air conditioning system according to claim 10, wherein the heat transfer means further comprises:
a controller to control the control valve to operate, during a cooling operation of the heat pump type air conditioner, in a cooling mode in which the regeneration heater circulation conduit is opened, and the pre-heater circulation conduit is closed, and to control the control valve to operate, during a heating operation of the heat pump type air conditioner, in a heating mode in which the regeneration heater circulation conduit is closed, and the pre-heater circulation conduit is opened.

15. The electricity generating and air conditioning system according to claim 6, wherein at least one of the engine, the generator, the indoor heat exchanger, the dehumidifying agent body, the regeneration heater, and the outdoor heat exchanger comprises a plurality of ones.

16. An electricity generating and air conditioning system comprising:
an engine;
a generator connected to an output shaft of the engine to generate electricity;
a cooling water heat exchanger to absorb heat from cooling water used to cool the engine;
an exhaust gas heat exchanger to absorb heat from exhaust gas discharged from the engine;
a heat pump type air conditioner, which uses the electricity generated from the generator, and comprises an outdoor unit including a compressor, a directional valve, an outdoor heat exchanger, and an expansion device, and an indoor unit including an indoor heat exchanger;
a dehumidifying agent body to dehumidify indoor air;
a regeneration heater arranged in the indoor unit to regenerate the dehumidifying agent body;
a pre-heater to pre-heat outdoor air blown to the outdoor heat exchanger; and
heat transfer means to transfer heat from at least one of the cooling water heat exchanger and the exhaust gas heat exchanger to the regeneration heater during a cooling operation of the heat pump type air conditioner, and to transfer heat from at least one of the cooling water heat exchanger and the exhaust gas heat exchanger to the pre-heater during a heating operation of the heat pump type air conditioner.

17. The electricity generating and air conditioning system according to claim 16, wherein the heat transfer means comprises:
a pre-heater circulation conduit to guide a heat medium to be circulated through the cooling water heat exchanger, the exhaust gas heat exchanger, and the pre-heater;
a regeneration heater circulation conduit to guide the heat medium to be circulated through the cooling water heat exchanger, the exhaust gas heat exchanger, and the regeneration heater; and
a heat medium circulation pump to pump the heat medium, and thus, to circulate the heat medium through the pre-heater circulation conduit or through the regeneration heater circulation conduit.

18. The electricity generating and air conditioning system according to claim 17, wherein the heat transfer means further comprises:
a control valve to alternately open/close the pre-heater circulation conduit and the regeneration heater circulation conduit; and
a controller to control the control valve to operate, during a cooling operation of the heat pump type air conditioner, in a cooling mode in which the regeneration heater circulation conduit is opened, and the pre-heater circulation conduit is closed, and to control the control valve to operate, during a heating operation of the heat pump type air conditioner, in a heating mode in which the regeneration heater circulation conduit is closed, and the pre-heater circulation conduit is opened.

19. The electricity generating and air conditioning system according to claim 16, wherein at least one of the engine, the generator, the indoor heat exchanger, the dehumidifying agent body, the regeneration heater, the outdoor heat exchanger, and the pre-heater comprises a plurality of ones.

* * * * *